United States Patent
Ladislaus et al.

(10) Patent No.: US 11,565,269 B2
(45) Date of Patent: Jan. 31, 2023

(54) APPARATUS AND METHOD FOR BULK PRODUCTION OF ATOMICALLY THIN 2-DIMENSIONAL MATERIALS INCLUDING GRAPHENE

(71) Applicant: Black Swan Graphene Inc., Toronto (CA)

(72) Inventors: Paul Ladislaus, Sedgefield (GB); Lee Glasgow, Consett (GB); Ronan McHale, Jesmond (GB)

(73) Assignee: Black Swan Graphene Inc., Toronto (CA)

( * ) Notice: Subject to any disclaimer, the term of this patent is extended or adjusted under 35 U.S.C. 154(b) by 104 days.

(21) Appl. No.: 17/218,985

(22) Filed: Mar. 31, 2021

(65) Prior Publication Data

US 2021/0237097 A1 Aug. 5, 2021

Related U.S. Application Data

(63) Continuation of application No. 16/341,673, filed as application No. PCT/GB2017/053104 on Oct. 13, 2017, now Pat. No. 10,994,280.

(30) Foreign Application Priority Data

Oct. 13, 2016 (GB) .................................. 1617392
Oct. 13, 2016 (GB) .................................. 1617396

(51) Int. Cl.
*B02C 19/06* (2006.01)
*C01B 32/19* (2017.01)
*B82Y 30/00* (2011.01)
*B82Y 40/00* (2011.01)

(52) U.S. Cl.
CPC ............ *B02C 19/066* (2013.01); *C01B 32/19* (2017.08); *B82Y 30/00* (2013.01); *B82Y 40/00* (2013.01)

(58) Field of Classification Search
CPC ... B02C 19/066; C01B 32/19; C01B 21/0648; B82Y 30/00; B82Y 40/00; C01G 39/06
See application file for complete search history.

(56) References Cited

U.S. PATENT DOCUMENTS 4,691,866 A * 9/1987 Belk ......................... B01J 19/26
241/12
5,358,188 A * 10/1994 Makino .................. B02C 19/066
241/5
6,824,086 B1 * 11/2004 Mazurkiewicz ...... B02C 19/065
241/39
8,585,277 B2 * 11/2013 Grandi ................ B01F 25/4423
138/46

(Continued)

OTHER PUBLICATIONS

Nacken, et al., Delamination of graphite in a high pressure homogenizer, RSC Adv. 2015; 5: 57328-57338 (Year: 2015).*

(Continued)

*Primary Examiner* — Daniel C. McCracken
(74) *Attorney, Agent, or Firm* — Fogg & Powers LLC

(57) ABSTRACT

The present invention provides an apparatus for the production of Graphene and similar atomic scale laminar materials by the delamination of a bulk laminar material, such as graphite. This apparatus provides prolonged head life and avoids catastrophic head wear in an isolated region. Overall product quality over time is better maintained. Also, the benefit of a self-unblocking delamination apparatus can be achieved whilst maintaining high product quality and consistency. Relatively small variation in gap size being sufficient to avoid blockage, such as occurs by the aggregation of large particles or groups of particles in the high shear gap used for delamination.

17 Claims, 4 Drawing Sheets

(56) References Cited

U.S. PATENT DOCUMENTS

| | | | |
|---|---|---|---|
| 10,822,238 B2 | 11/2020 | Ladislaus et al. | |
| 10,994,280 B2 * | 5/2021 | Ladislaus | C01B 32/19 |
| 11,130,140 B2 * | 9/2021 | Ladislaus | B02C 19/066 |
| 2010/0189628 A1 * | 7/2010 | Schimpf | B82B 3/0076 |
| | | | 423/447.2 |
| 2019/0366353 A1 | 12/2019 | Ladislaus et al. | |

OTHER PUBLICATIONS

Arao et al., "Mass production of high-aspect-ratio few-layer-graphene by high-speed laminar flow", Carbon 102, Feb. 23, 2016, pp. 330-338, Elsevier Ltd.

International Bureau, "International Preliminary Report on Patentability from PCT Application No. PCT/GB2017/053104 dated Apr. 16, 2019", pp. 1-7, Published: WO.

International Searching Authority, "International Search Report and Written Opinion from PCT Application No. PCT/GB2017/053104 dated Dec. 12, 2017", pp. 1-10, Published: WO.

Nacken et al., "Delamination of graphite in a high pressure homogenizer", RSC Advances, 2015, pp. 57328-57338, The Royal Society of Chemistry.

U.S. Patent and Trademark Office, "Notice of Allowance", U.S. Appl. No. 16/341,673, filed Feb. 18, 2021, pp. 1 through 18, Published: US.

Yi et al., "A review on mechanical exfoliation for the scalable production of graphene", Journal of Materials Chemistry A, 2015, pp. 11700-11715, The Royal Society of Chemistry.

* cited by examiner

APPARATUS AND METHOD FOR BULK PRODUCTION OF ATOMICALLY THIN 2-DIMENSIONAL MATERIALS INCLUDING GRAPHENE

CROSS-REFERENCE TO RELATED APPLICATIONS

This application is a U.S. continuation patent application claiming priority to, and the benefit of, U.S. patent application Ser. No. 16/341,673, titled "APPARATUS AND METHOD FOR BULK PRODUCTION OF ATOMICALLY THIN 2-DIMENSIONAL MATERIALS INCLUDING GRAPHENE" filed on Apr. 12, 2019, which was a 371 U.S. National Stage Application of PCT Application Serial No. PCT/GB2017/053104, filed on Oct. 13, 2017, which claims the benefit of, and priority to, Great Britain Patent Application 1617396.5 filed on Oct. 13, 2016 and Great Britain Patent Application 1617392.4 filed on Oct. 13, 2016, each of which are incorporated herein by reference in their entirety.

TECHNICAL FIELD

Graphene is a two-dimensional allotrope of carbon, consisting of sheets of a few atoms thickness in a hexagonal structure. Analogues of this material can include other chemistries which include boron nitride and molybdenum disulphide. The present invention relates to a process and apparatus for producing atomically thin 2-dimensional materials, for example, graphene. In particular, the invention is directed to a simple, scalable process for producing high-quality, defect-free, unoxidised 2-dimensional materials, for example graphene, in commercially useful quantities. Such a material will have applications in composites, coatings, thermal management and electronic devices where properties of electrical conductivity, thermal conductivity, barrier and mechanical strength are of importance.

BACKGROUND OF THE INVENTION

Graphene is a two-dimensional allotrope of carbon, consisting of sheets of a few atoms thickness in a hexagonal structure. Analogues of this material can include other chemistries which include boron nitride and molybdenum disulphide.

Graphite, the widely used mineral is effectively a crystalline form of graphene, in which layers of graphene are bound together by van der Waals forces. Graphene has attracted considerable interest since its discovery as an isolatable material in 2004. The novel mechanical, thermal and electrical properties of the material suggest a number of uses. Graphene can be produced on a laboratory scale sufficient for experimental analysis, but production in commercial quantities is still a developing area. Other single layered structures such as boron nitride are expected to exhibit similarly interesting properties in the nanotechnology field. A review of this technology has been compiled by Min Yi and Zhigang Shen and their titled 'A review on mechanical exfoliation for the scalable production of graphene', Journal of Materials Chemistry, A, 2015, 3, 11700 provides an overview of the state of the art regarding graphene production.

Bottom-up techniques, such as chemical vapour deposition and epitaxial growth, can yield high-quality graphene with a small number of defects. The resultant graphene is a good candidate for electronic devices. However, these thin-film growth techniques suffer from a limited scale and complex and hence expensive production, and cannot meet the requirements of producing industrially relevant quantities of graphene.

Large-scale production of graphene at a low cost has been demonstrated using top-down techniques, whereby graphene is produced through the direct exfoliation of graphite, sometimes suspended in a liquid phase. The starting material for this is three-dimensional graphite, which is separated by mechanical and/or chemical means to reveal graphene sheets a few atoms thick.

The original technique used by the discoverers of graphene, the "Scotch Tape" method can be used to prepare high-quality and large-area graphene flakes is limited to laboratory research and seems unfeasible to scale up for industrial production.

The three-roll mill technique is a method to scale up the Scotch Tape method, using polyvinyl chloride (PVC) dissolved in dioctylphthalate (DOP) as the adhesive on moving rolls which can provide continuous exfoliation. Though the three-roll mill machine is a known industrial technique, the complete removal of residual PVC and DOP to obtain graphene is not easy and brings about additional complexity.

Trinity College Dublin have developed a high-yield production of graphene by the sonication assisted liquid-phase exfoliation of graphite in 2008. Starting with graphite powder dispersed in specific organic solvents, followed by sonication and centrifugation, they obtained a graphene dispersion. This method of producing graphene is capable of scaling up but one shortcoming is the extremely low graphene concentration (around 0.01 mg/ml) of the suspension produced, which is not necessarily suitable for bulk production.

Additionally, ultrasonic processors can only achieve the high-power density required in small volumes, so it is difficult to scale up this process to achieve any economy of scale. A relevant disclosure can be found in WO2013/010211A1.

Shear Force Techniques.

As is well known, graphite layers have a low resistance to shear force which makes graphite a useful lubricant. This has been exploited in a number of techniques which apply shear force to exfoliate graphene from graphite.

Ball milling, a common technique in the powder industry, is a method of generating shear force. A secondary effect is the collisions or vertical impacts by the balls during rolling actions which can fragment graphene flakes into smaller ones, and sometimes even destroy the crystalline nature of structures.

Several improvements to the ball milling technique have been attempted, such as wet ball milling with the addition of solvents, but these techniques still require a very long processing time (around 30 hours) and produce a high number of defects even if suitable for industrial scale, bulk, production. A relevant disclosure can be found in WO 2012117251 A1.

Some shear force production techniques have used an ion intercalation step prior to applying the shear force to weaken the inter-layer bonds. This reduces the energy required to exfoliate the graphite into graphene, but the resulting graphene may be contaminated with residual ions contaminating the finished product, and the process requires additional time and cost which reduces the industrial application of this technique.

More recently fluid dynamics based methods have emerged for graphite exfoliation. These are based on mixing graphite in a powder or flake form with a fluid to form a suspension, the fluid can then be subjected to turbulent orviscous forces which apply shear stress to the suspended particles. Usually the fluid is either a liquid of the type often used as a solvent and may include a surfactant mixture tailored to the removable from the finished product.

One method of generating the shear forces is with a high shear, for example rotary mixer. Graphene exfoliation has been demonstrated using a kitchen blender to create shear forces on graphite particles in suspension. This process has been scaled up using commercial high shear mixers comprising rotating blades passing in close proximity to an aperture screen to produce high shear. The graphite particles experience a shear force applied by the fluid due to the difference in velocity of the mixing blades and the static shear screen. A relevant disclosure can be found in WO2012/028724A1 and WO 2014/140324 A1.

A further method is the use of a high-pressure homogeniser with a micro fluidiser. The micro fluidiser in this case consist of a channel with a microscale dimensions, meaning of around 75 µm. Fluid is forced through the channel from an inlet to an outlet using high pressure. This technology is derivate of fluids processing used in milk production, such as disclosed in EP 0 034 675, U.S. Pat. No. 8,585,277B2 and WO2016174528A1 but this apparatus is unsuitable for use with suspended solids as this gives rise to blockage and high wear rates as milk production equipment for fluids homogenisation is a different technical problem in engineering terms. Because of the narrow dimension of the channel, there is a high shear force generated by viscous friction between the walls and the book flow which leads to delamination of the graphite. This method requires very high pressures and the starting graphite must already have been comminuted into the micron size range. A relevant disclosure can be found in WO2015/099457.

A further variation can be found in Nacken, RSC Advances, 2015, 5, 57328. Here a fluid is expelled through a nozzle into a void against a valve giving back-pressure to avoid cavitation in the expansion chamber. Here a material such as graphene is delamination as the fluid exits the nozzle into the expansion chamber.

For completeness a superficially similar technology is described in WO 2004/052567. Here a suspension of solid is impinged against a rotating disc which, revolving at high rpm accelerates the suspension outward to impinge at high force against a collision ring spaced apart from the rim of the disc. The high rotational speed and grooves in the driven disc mean that relatively large gaps (mm rather than µm) are present at both inlet and outlet of the disc to allow for vibration of the disc, particularly as resonant frequencies can be passed on speed up and slow down (between 0 and 40,000 rpm). Further the shear stress created is insufficient, or possibly the lack of cavitation means that this equipment is not suitable for to delaminating laminar materials There exists a need for a graphene production process that can produce graphene using less energy, that can be scaled up to high rates of production without loss of quality of the finished product. Such an apparatus is disclosed in copending patent applications GB15181.5 and PCT/GB2016/053177. That apparatus provides a fluid conduit for impacting a suspension of particles to be de-laminated against an impact head having an impact face and an annular gap. In practice it is been found that the apparatus has a limited lifespan before maintenance is required as the annular gap can either become clogged with particulate material and/or become worn so as to provide an uneven gap through which suspension preferentially flows and which in turn makes the gap even larger. Whilst these two problems tend to be mutually exclusive they are not necessarily so. Clogging tends to occur when fresh suspension is introduced, i.e. larger particles and an unworn head. Wear of the type mentioned tends to occur after prolonged use and can generate a path of least resistance through which larger particles can escape but with poor de-lamination. There is a need to provide an improved apparatus is the purpose of the apparatus is for the industrial scale delamination of suspensions of laminar material, such as for the production of graphene from graphite and industrial production requires operation over a prolonged period of time, such as hours if not days of operation. This application predominantly addresses the question of wear.

The present invention seeks to overcome the problems in previous techniques to provide a production method for graphene that is rapid, scalable to industrial quantities and energy efficient.

DRAWINGS

The apparatus of the present invention will now be illustrated by means of the following figures in which.

Figure 1:
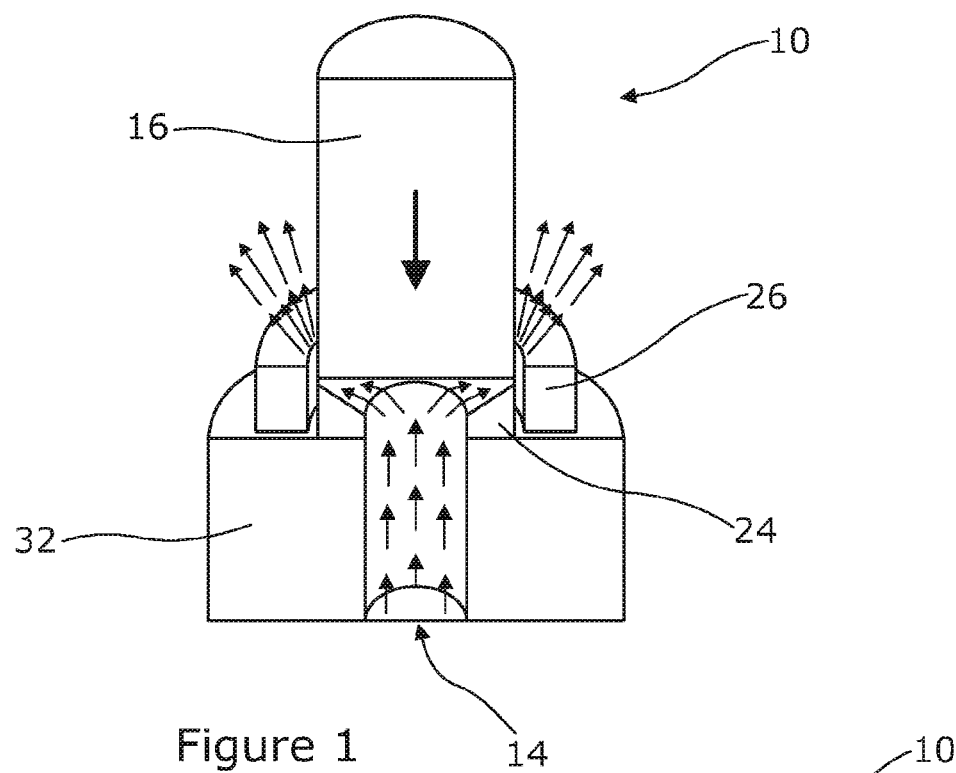
FIG. 1 shows a schematic view of the fluid path through the apparatus of the present invention and illustrates core components.
Figure 2:
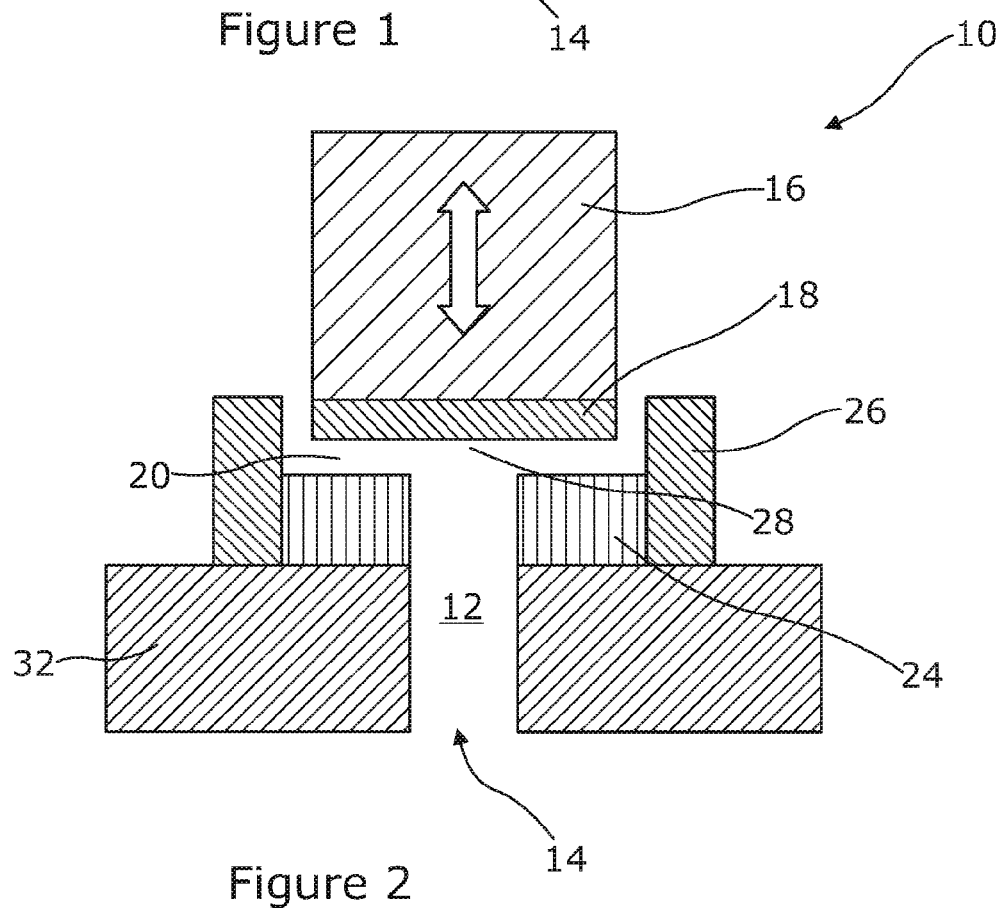
FIG. 2 shows a schematic view in cross-section of a first arrangement of core components of the apparatus of the present invention.

The diagrams provide the following features:
10 assembly of core components;
12 fluid conduit/volume;
14 entrance to fluid conduit at a point distal from the impact head;
16 impact head assembly;
18 optional facing (impact face) of impact head assembly;
20 annulus;
202 frusto conical annulus;
204 outer annulus;
22 support structure;
24 exit of fluid conduit proximal to the impact head/proximal end of the conduit;
242 proximal end of the conduit, alternative form;
26 impact head surround;
28 face of the impact head;
32 conduit/pipe; (when the bottom line in FIG. 5)
100 system or (extended) apparatus of the present invention;
110 starting material vessel;
112 high pressure pump;
114 valve;
124 pressure drop valve;
116 finished product vessel;
118 chiller/cooler.

DETAILED DESCRIPTION

The present invention in its various aspects is as set out in the appended claims. In a first aspect the present invention provides: An apparatus for the production of Graphene and similar atomic scale laminar materials by the delamination of a bulk laminar material, such as graphite; the apparatus comprising: a main pump (112) suitable for pumping a fluid, the fluid being a suspension of solid particles of the bulk laminar material, at a pressure of greater than MPa, towards and in fluid communication with; core components (10), the core components comprising: a fluid conduit (12) having a principal axis suitable for conveying said fluid, wherein the fluid conduit is arranged to direct fluid at said pressure from that conduit against; an impact head (16) having an impact face perpendicular or substantially perpendicular to said principal axis; the impact head and the conduit being arranged so that an annular gap (20) of between 500 µm and 1 µm results between an end of the conduit proximate to the impact head and the impact head wherein the gap forms a continuous region surrounding the end of the conduit and being substantially coplanar with the impact head; and an impact head surround (26) which extends the region in which the fluid is constrained before exiting the core components, wherein, the impact head is symmetric about a longitudinal axis which is in line with the principal axis suitable for conveying said fluid and such that the symmetry allows rotation of the head.

Hence, suitable symmetry will comprise an impact head being cylindrical and/or (frusto) conical or being comprised of cylindrical and/or (frusto) conical portions. The symmetry is preferably a radial symmetry about the principal axis. This is because unsymmetrical apparatus, such as shown in WO 2015/099378 provides a less homogeneous product de-lamination. This thought to be because a variety of pathways through the high shear field are present. Also, low turbulence regions gather solids deposits from the fluid and this can give rise to clogging and blocking. This occurs both on a gradual basis and, particularly when flow rates change (such as on start-up) blocks of deposits can be dislodge and block the flow paths and require equipment strip-down and cleaning.

Preferably, solid particles are particles of graphite, hexagonal boron nitride or molybdenum disulphide. Most preferably the solid particles are graphite.

The fluid may be a suspension, preferably in the particle size range 1 µm to 1000 µm. The suspension is preferably an aqueous suspension.

The benefits and capabilities of this general type of apparatus have been disclosed in copending UK patent application GB15181.5. This apparatus has been found to enable delamination of graphite and similar laminar materials at pressures and energy levels below those available required by a microfluidiser. This has the additional advantage that heat build-up in the process is reduced.

A (substantially) perpendicular arrangement and within a narrow band of pneumatically mediated movement, annular spacing is highly beneficial for providing consistent product. Substantially perpendicular therefore encompasses at most a 10° offset, preferably no more than 1°, most preferably no more than 0.1°. Such an offset may be conical.

However, consistent product quality may not be obtained after prolonged use, prolonged sometimes being no more than numbers of hours. A weak point in the impact head can give rise to localised erosion and the annular gap can become uneven, giving rise to a localised channel of larger dimensions, this can then wear away to the extent shown in FIG. 1, during which time product quality rapidly decreases as the amount of suspension undergoing the required shear/impact regime of the apparatus reduces as does the pressure drop across the impact head.

It has been found that providing the impact head that is symmetric about a longitudinal axis which is in line with the principal axis suitable for conveying said fluid overcomes the issue of selective wear. The preferred form of symmetry is expressed as a cylinder and/or (frusto) conical geometry. Portions of the head may be unsymmetrical such as to engage a mechanical shaft to control rotation, provided symmetry is present to the extent necessary to enable rotation of the impact head in the apparatus.

It appears that having a symmetrical head, the symmetry being such as to enable rotation of the head in the apparatus, allows a degree of rotation and this serves to even out wear. This is surprising since in an initial view a rotatable head should rotate to give the maximum aperture size so as to relieve the incoming pressure and hence should exacerbate localised wear. However, whilst not wishing to be bound by theory, the high degree of turbulence in this apparatus is speculated to give rise to non-linear forces and combine, perhaps, with vibration which means that the forces giving rise to rotation of the head can outweigh those which would preferentially orientate it to provide the largest gap.

The effects of this ability to rotate, arising from the symmetry of the impact head in relation to the incoming fluid can be seen with a replacement head operated for a similar length of time. Here there is some evidence of localised wear over a span of around 50°, as shown by the lighter colour but this is by no means to the extent shown in FIG. 1 in which localised wear is understood to have rapidly widened to provide the notch shown.

The impact head of the apparatus may be freely rotatable about the principal axis. This has been shown to be effective, as mentioned above.

In designing the apparatus, the impact head is seating in a housing (not shown for clarity in the schematic diagrams). The fit of the head in the housing will be determined by the skilled person so as to permit rotation but to also give dimensional stability, so for example to stop unsymmetrical rotation which can be destructive at the high pressures involved. Similarly, large tolerances of fit can allow unduly rapid rotation and give rise to lateral wear of the impact head and consequent leakage and loss of fit. Fit here is used in the engineering sense of the word. Specifically, ISO is the internationally accepted standard for defining engineering fits, but ANSI is used in North America.

ISO and ANSI both group fits into three categories: clearance, transition, and interference. Within each category are several codes to define the size limits of the hole or shaft—the combination of which determines the type of fit. A fit is selected at the design stage according to whether the mating parts need to be accurately located, free to slide or rotate, separated easily, or resist separation. In the present instance the impact head and the housing fit falls in the free to slide or rotate category of clearance fits. This allows the design engineer to choose suitable tolerances for any given material combination. As a guide the preferred clearance fits are:

Easy running clearance fit—Moderate clearances with minimal requirements for accuracy—e.g. high running speeds, ISO 286-2 H9/e9

Close running clearance fit—Small clearances with moderate requirements for accuracy—e.g. moderate running speeds, ISO 286-2 H8/f7

Sliding clearance fit—Minimal clearances for high accuracy requirements, which can be easily assembled and will turn & slide freely, ISO 286-2 H7/g6

Location clearance fit—Very close clearances for precise accuracy requirements, which can be assembled without force and will turn & slide when lubricated, ISO 286-2 H7/h6.

In practice it has been found that sliding and location are preferred as the large forces present at the required pressure of greater than MPa and the required gap of between 500 μm and 1 μm in the present invention allow for sufficient rotational force to be imparted by turbulence whilst maintaining the gap particularly when using these tolerances. In the event of doubt then the 'H' ISO tolerance is preferred. The above practical consideration set the apparatus far apart from technologies such as found in WO 2004/052567 where gap sizes in the order of mm are present.

The impact face of the impact head is preferably symmetrical. This is preferable because asymmetry, such as to encourage rotation of the impact head and therefore more readily even out wear has not been found to be beneficial as in practice a point of localised wear does actually occur (such as if the notch is present) or if configured to induce rotation the high pressures of the device give such a degree of rotation that spinning, chattering and wear of the bore in which the impact head is located may occur. In particular it appears that whilst a superficially perfectly symmetrical impact head located with a clearance fit in a housing should not rotate, in practice rotation does occur likely due to turbulence in fluid flow and/or equipment vibration. This induced rotation is preferably found in the order of 0.05 to 50 rotations per minute (rpm). Preferably 0.1 to 10 rpm Some trial and error may be required for any given installation to achieve this but no more than that of testing a narrow range of fits at a given pressure for a given bulk laminar material.

Nevertheless, it is also contemplated that the impact head (16) of the apparatus is configured to be rotatable about the principal axis as constrained by a mechanism. The mechanism may for example, be a shaft with a drive rate, such as in the aforementioned ranges. Although this is not preferred as it gives rise to additional complexity and may be difficult to implement given the forces and pressures involved. Nevertheless, it is a mechanism to avoid the trial and error approach mentioned above and so allow a wider range of feedstocks and pressures to be used for a given equipment set-up.

In summary, the impact head of the apparatus of present invention is in use rotatable. This term will be interpreted by the skilled person to mean that under the forces of operation rotation may occur. It does not mean that the head will necessarily spin freely or be capable of moving by hand or even with simple tools, such as when not in operation, as the clearances of the parts, such as the impact head in the bore of the device which may receive it, are close. In the event that for a given impact head in housing set-up leakage between the head and housing may be an issue then an O-ring seal may be used to prevent this.

The impact head of the present invention may be combined with a pneumatic adjustment mechanism such that the gap in the apparatus varies depending upon the pressure exerted by incoming fluid during use. This is advantageous as in addition to a rotational movement an axial movement may also occur so as to enable clearance of any blockage in the gap.

The impact head may comprise normal engineering materials, such as steel. This is not surprising since prior art disclosures all use steel or stainless steel apparatus given that graphite and graphene are good lubricants. In particular, graphite has a Hardness (Mohs) of 1-2 and a Hardness (Vickers) of VHN10=7-11 $kg/mm^2$ this in comparison to a conventional steel of Hardness (Mohs) 4-4.5 and for high speed steel VHN10=7-11 $kg/mm^2$. However, we have surprisingly found that harder impact head materials provide potentially greater throughput. Whilst not wishing to be bound by theory is thought that the elasticity of the impact head is lower for harder materials and therefore exfoliation is made more efficient. However, chromium with a Hardness (Mohs) of 8.5 is not necessarily better than steel (for which wear and abrasion with quality graphite has not been an issue) whereas the group alumina, silicon nitride, tungsten carbide, silicon carbide, boron nitride and diamond are preferred. In particular, diamond is the most preferred. Whilst not wishing to be bound by theory it would appear that the energy of interaction between diamond and graphite, both of course being carbon materials, is the lowest but the difference in crystal structure of diamond and graphite gives rise to the necessary hardness.

The apparatus of the present invention has been found to be more efficacious when the impact head is cooled. It is not entirely clear why this is the case as the viscosity of the fluid should be greater at low-temperature. The apparatus of the present invention preferably comprises a cooled impact head, the apparatus is preferably configured to enable the impact head at a flow rate of greater than 1000l/hr to be maintained at a temperature less than 50° C., preferably less than 25° C., most preferably less than 10° C. It has been found that the most efficient surface cooling of the impact head is obtained using a diamond impact head.

In a second aspect, the present invention encompasses the use of the apparatus described herein for the production of Graphene and similar atomic scale laminar materials by the delamination of a bulk laminar material, such as graphite.

Method of the Invention

In a third aspect the present invention provides a method for exfoliation of laminar materials to produce atomic scale laminar materials by the delamination of bulk material; the method comprises the steps of providing the apparatus described herein and passing through the apparatus a suspension of laminar material in a liquid wherein the impact head is permitted to or is urged to rotate during operation.

This has the effect of evening out wear on the impact head so as to avoid localised wear, which then forms a preferential flow path and thus gives rise to further localised wear. Surprisingly, the rotation available by providing an axially symmetric component, such as a cylinder or a cone where the rotation is not actively urged to rotate by an external mechanism has proven sufficient to substantially mitigate the problem of localised wear without providing an external driving force such as by means of the mechanical linkage. Even so the provision of an external mechanical driving force ensures that more even wear occurs and may be used if the additional mechanical complexity cost is acceptable in a given situation.

In the method of the present invention the laminar material is preferably graphite and the atomic scale laminar material is graphene.

The liquid in which the laminar material is suspended is preferably water. Water is preferable due to its high specific heat capacity which better enables the process to be run in the temperature range of 30° C. to 80° C. In addition, the localised head temperature, which as previously mentioned is preferably below room temperature (and specifically below 10° C.) is more easily maintained with water as the liquid. Other suitable liquids are liquid hydrocarbons.

The method of the present invention is preferably operated at a temperature of from 30° C. to 80° C.

The graphite is preferably in the particle size range 1 µm to 1000 µm, more preferably in the particle size range 3 to 50 µm, most preferably in the size range 15-25 µm. The size may be determined using a Malvern Mastersizer using the D4,3 particle size measure.

Laminar material, preferably graphite, loading in the liquid phase is preferably in the range up to 500 grams per litre (g/l). More preferably laminar material loading is 10-125 g/l, most preferably 125 g/l.

The fluid of the present invention is impacted upon the impact head at a pressure of greater than 1 MPa, more preferably at a pressure in the range 10 MPa to 150 MPa still more preferably in the range 40 to 100 MPa. Most preferably at a pressure in the range 50 MPa to 70 MPa. The pressure selection gives an optimised throughput, yield and energy consumption.

It has surprisingly been found that it is not simply a case of the higher the pressure the better, this potentially giving higher impact forces upon the impact head but that an optimum pressure range is found. This optimum range provides a highest quality of laminate sheet, such as graphene. Whilst not wishing to be bound by theory it is considered that unduly high system energies result in breakup of the laminate. There is therefore an optimum pressure range for a system configured with an impact head such that the solid in the fluid is laminated (exfoliated) whilst the exfoliated laminar sheets are not unduly damaged.

The method of the present invention preferably comprises a fluid in which a surfactant is present. Suitable surfactants include sodium alkyl benzene sulphonate and tetra butyl ammonium chloride.

The preferred surfactant is sodium cholate.

The surfactant is preferably an anionic or cationic surfactant which can be neutralised to remove its anionic or cationic character respectively so as to enable facile removal of the surfactant from the fluid. The method of the present invention therefore optionally comprises a neutralisation step of taking the fluid resulting from the method the fluid comprising an anionic or cationic surfactants, that produced fluid comprising laminar sheets of material, preferably graphene, and neutralizing said surfactant before washing said surfactant from the sheet of material (which may during this process precipitate), so as to produce a composition consisting of laminar sheets of material in the liquid forming the continuous phase of the fluid.

The method of the present invention preferably comprises a filtration step in which particulate material is removed by said filtration step (using whatever mechanism). The filtration step may preferably take place after the neutralisation step.

The present invention also encompasses the second aspect, with the use of a high-pressure homogeniser, such as of the type disclosed with respect to the drawings, for the production of graphene from graphite in aqueous suspension.

The conditions and parameters relevant to the method of the present invention are also applicable to the configuration of the apparatus of the present invention. Unless mentioned otherwise herein temperatures are at 25° C. and atmospheric pressure is 1 atm.

Specific Description

Referring to FIGS. 1 to 4 In use the apparatus of the present invention has fluid pumped from a pump 112 through a conduit 32 in the form of a pipe which terminates as part of the core assembly 10. The core assembly 10 has a proximal end 24 of the pipe 32 in which fluid in the volume of the conduit 12 exits the conduit under pressure so as to impact upon impact head 16; which can have a face of a hardened material 18. When the fluid impacts upon the face of the impact head it then travels through annulus 20 defined between the face of the impact head 28 and the proximal end of the conduit 24 before exiting the core components, such as to be recirculated or to recover it as finished product. In the particular figure a further impact head surround 26 is provided so as to extend the region in which the fluid is constrained before exiting the core components in use. The impact head 16 of the apparatus is configured so as to be preferably movable relative to the proximal end of the conduit 24 and thus definition of an optimal annular gap 20 can be achieved.

Figure 3:
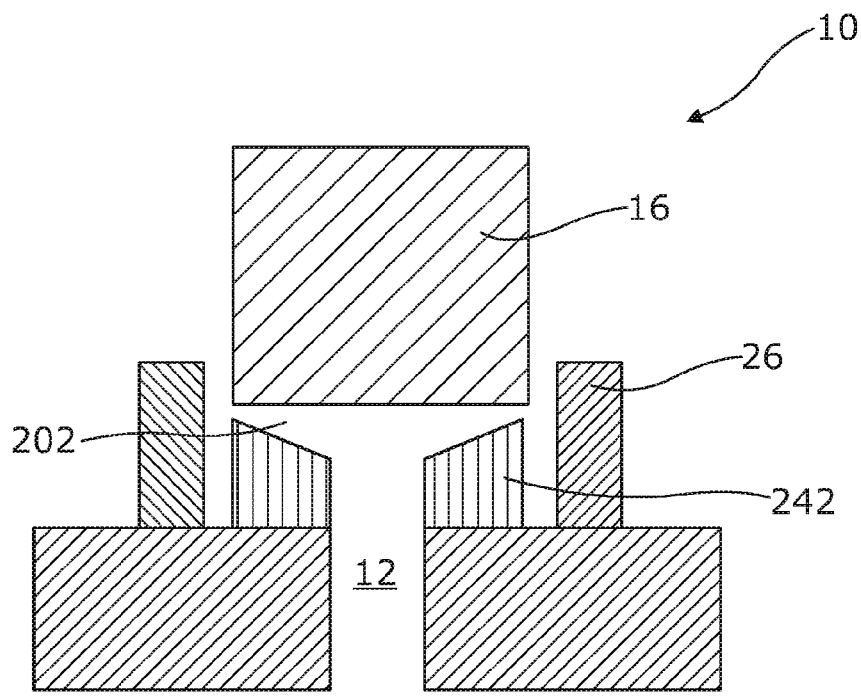
FIG. 3 shows a schematic view in cross-section of a second arrangement of core components of the apparatus of the present invention.

In FIG. 3 the proximal end of the conduit 242 has an internally bevelled face such that in use fluid being transferred from the volume of the conduit 12 through the core components accelerates in the annulus (which is now frusto conical) until a pinch point is arrived at giving maximal shear.

Figure 4:
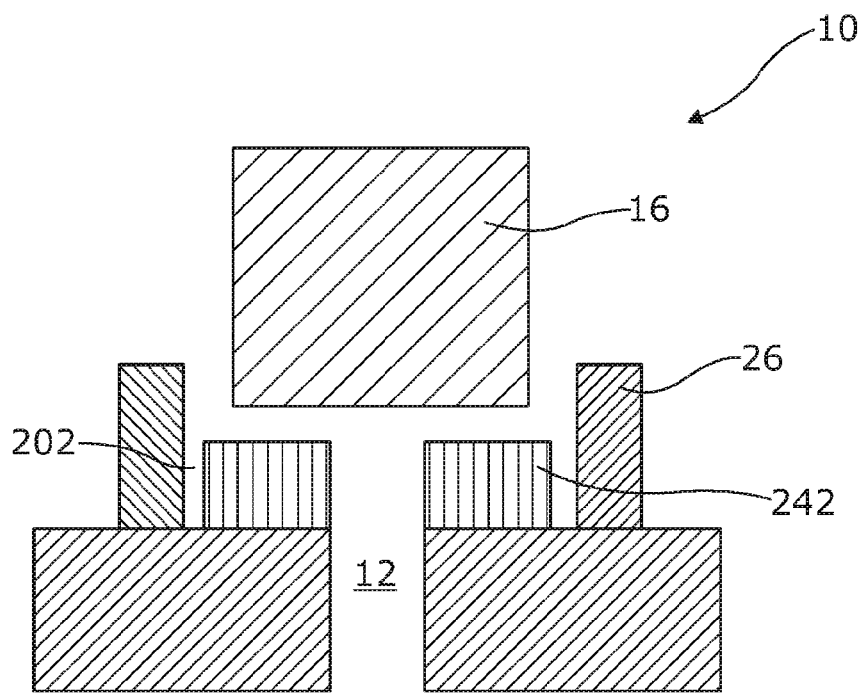
FIG. 4 shows a schematic view in cross-section of a second arrangement of core components of the apparatus of the present invention.

In FIG. 4 the proximal end of the conduit 24 does not abut the impact head surround and provides an outer annulus region 204 in which turbulent flow may occur for improved processing. The outer annulus region 204 is presented in FIG. 3 in conjunction with the internally bevelled face but FIG. 3 may be provided without region 204.

Figure 5:
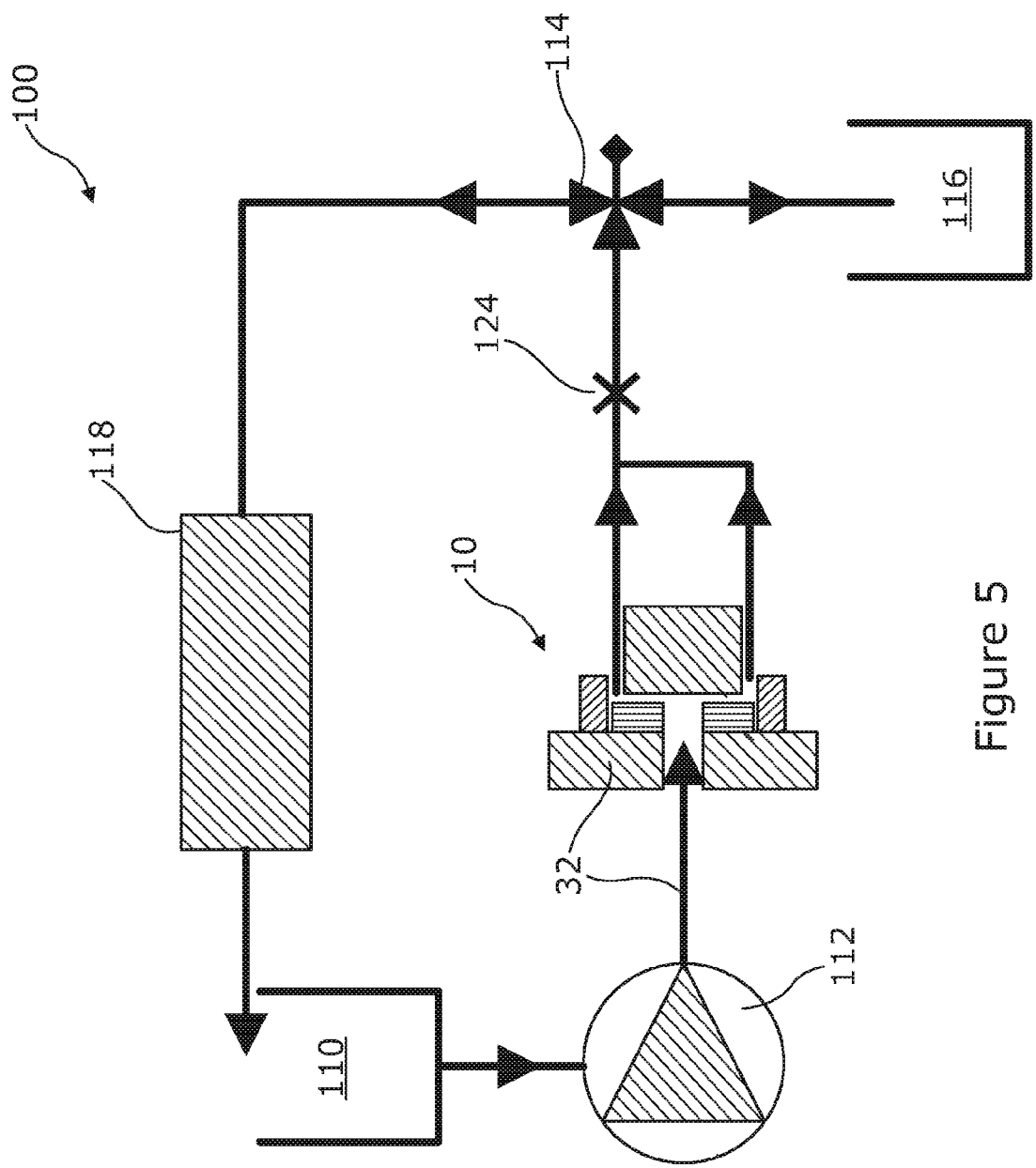
FIG. 5 shows a schematic view of a system or apparatus of the present invention comprising the core components in conjunction with auxiliary components to provide an optimal processing system for performing the method of the present invention.
Figure 6:
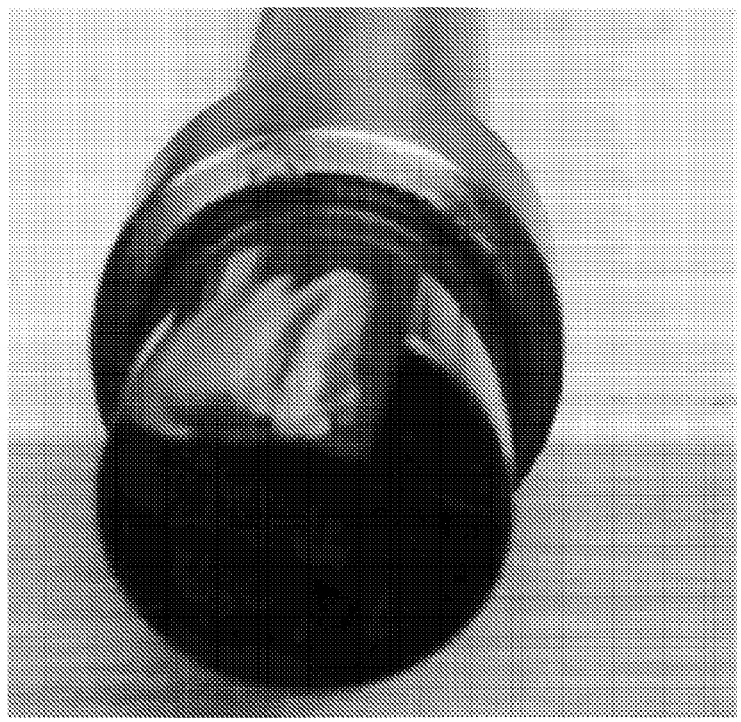
Figure 7:
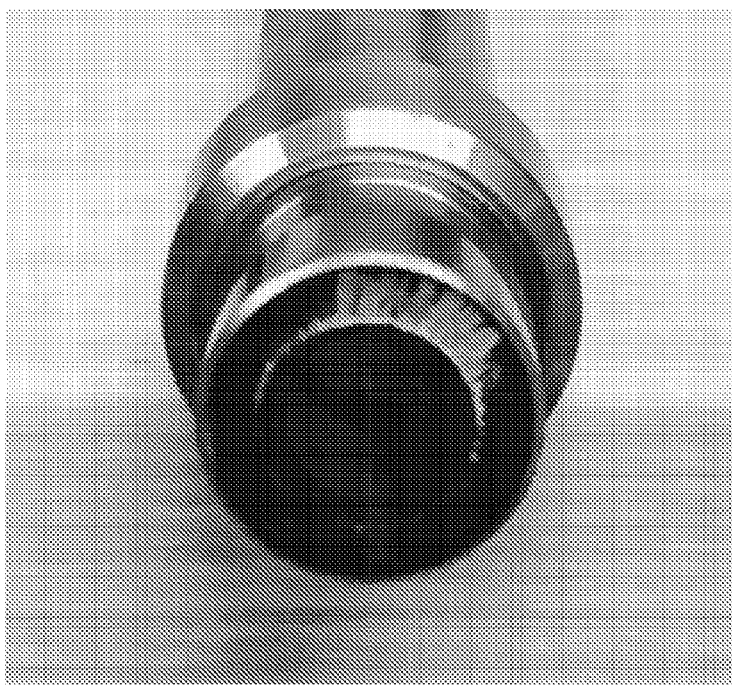

Referring to FIG. 5 a processing system of the present invention comprises core components 10 as previously described. The system is configured so that raw material is provided in vessel 110 and is pumped through high pressure pump 112 into the conduit 12/32 into the core components 10 and in particular the impact head 16 before exiting to optional pressure drop valve 124 so as to provide backpressure to the core components for improved processing. The system is further configured so that fluid then passes through directional control valve 114 either as finished product to product vessel 116 or is recirculated through chiller 118 before entering high pressure pump 112 for optional recirculation.

Experimental

An apparatus of the present invention comprising a 3 kw impeller pre-pump at 400 kPa output feeds a 30 kW multiple piston main pump pumping a graphite suspension of average particle size 20 µm and 100 g/l of graphite solid particles at a pressure of 60 MPa (+/−1 MPa) and a flow rate of 1200 l/hr along a fluid conduit having a principal axis a cylindrical impact head having an end impact face perpendicular to said principal axis. The cylinder is 15 mm diameter and 25 mm long and set in corresponding bore of a housing (itself a 20 cm long cylinder), the bore accommodating 15 mm of the cylindrical impact head. The gap is set at 5 µm. The suspension is initially at a temperature of 20° C. and is maintained at a temperature of 30° C. by cooling before recirculating back into the apparatus.

The recirculation loop having a hold-up of 500 litres. The base of the cylindrical impact head (the face remote from the impact face) is supported by the housing. The impact head is located in the housing according to ISO 286-2 H7. The head is lightly scribed with an indicium on the side of the cylinder and this aligned with a similar indicium in the housing. The machine was run for 15 minutes. The foregoing is runs 1 and 4. The experiment was repeated with fresh suspension and the head sealed in place with an epoxy adhesive to stop rotation and to fill the ISO 286-2 H7 clearance, the indicia being re-aligned. This is runs 2 and 3.

Results

| | Result | Rotation by inspection of indicia on dismantling |
|---|---|---|
| Run 1 | Clean run, no blockage | Moved by more than 90° |
| Run 2 | Blockage evidenced by 50% increase in backpressure after 5 minutes. | None - indicia still aligned |
| Run 3 | Run 2 unblocked and continued blockageevidenced by 50% increase in backpressure after 8 minutes | None - indicia still aligned |
| Run 4 | Clean run, no blockage - repeat of run 1 after adhesive removed and parts polished. | Moved by more than 90° |

It is thought that the rotating head serves to stop blockages building up by breaking up and dislodging the material before significant back-pressure is created. The blockage was also indirectly evidenced by seeing the residue on the apparatus when taken apart. Whilst blockage could be avoided by using a finer starting material this would require a pre-processing run to reduce the feedstock size and turn a continuous process into a less efficient batch process. A larger gap could also be used by this would give rise to a much longer processing time as the equipment would be run in two stages of gap size. The degree of rotations is not known from the above. However, from other experiments a rotation rate in the order of 10 rpm was inferred in a run-inspect-run etc. Run 5 otherwise equivalent to Run 1. The product of Runs 1 and 4 comprised graphene.

The present invention provides an apparatus more resistant to blockage when used with a suspended solid capable of delamination. It is likely that solid which is not laminar would not be so easily broken up by a rotating head.

Pressures herein are pressures above atmospheric pressure. Temperatures herein are 20° C. unless stated otherwise.

Preferred embodiments of the present invention are as numbered below:

1. An apparatus for the production of Graphene and similar atomic scale laminar materials by the delamination of a bulk laminar material; the apparatus comprising:
   a main pump (112) suitable for pumping a fluid, the fluid being a suspension of solid particles of the bulk laminar material, at a pressure of greater than 1 MPa, towards and in fluid communication with;
   core components (10), the core components comprising:
   a fluid conduit (12) having a principal axis suitable for conveying said fluid, wherein the fluid conduit is arranged to direct fluid at said pressure from that conduit against;
   an impact head (16) having an impact face perpendicular or substantially perpendicular to said principal axis; the impact head and the conduit being arranged so that an annular gap (20) of between 500 μm and 1 μm results between an end of the conduit proximate to the impact head and the impact head wherein the gap forms a continuous region surrounding the end of the conduit and being substantially coplanar with the impact head; and
   an impact head surround (26) which extends the region in which the fluid is constrained before exiting the core components, wherein the impact head is symmetric about a longitudinal axis which is in line with the principal axis and such that the symmetry allows rotation of the head.
2. The apparatus of embodiment 1, further comprising a pressure drop valve (124) downstream of the impact head (16) so as to provide backpressure.
3. The apparatus of embodiment 1 wherein the arrangement between the impact head face and the principal axis is 1° or less from perpendicular.
4. The apparatus of any preceding embodiment wherein the impact head (16) of the apparatus is movable along the principal axis relative to the proximal end of the conduit (24) for adjusting the annular gap (20).
5. The apparatus of any preceding embodiment wherein the impact head (16) of the apparatus is freely rotatable about the principal axis.
6. The apparatus of any of embodiments 1 to 4 wherein the impact head (16) of the apparatus is configured to be rotatable about the principal axis as constrained by a mechanism.
7. The apparatus of any preceding embodiment wherein the proximal end of the conduit (242) has an internally bevelled face such that the annular gap is frusto-conical, whereby in use fluid being transferred from the volume of the conduit (12) through the core components accelerates in until a minimum height of the annular gap is arrived at for giving maximal shear.
8. The apparatus of embodiment 5 wherein the width of the annular gap is between 500 μm and 200 μm at its widest point, and between 200 μm and 1 μm at its narrowest point.
9. The apparatus of any preceding embodiment wherein the proximal end of the conduit (24) does not abut the impact head surround (26) and provides an outer annulus region (204).
10. The apparatus of any preceding embodiment, wherein the impact face (18) of the impact head (16) comprises material selected from the group tungsten carbide, zirconia, silicon nitride, alumina silicon carbide, boron nitride and diamond.
11. The apparatus of any preceding embodiment, wherein the impact face of the impact head comprises diamond.
12. A method for exfoliation of laminar materials to produce atomic scale laminar materials by the delamination of bulk material; the method comprises the steps of: providing the apparatus described in Embodiment 1 and; passing through the apparatus a suspension of laminar material in a liquid at a pressure of greater than 1 MPa at the impact head.
13. The apparatus or method of any preceding embodiment, wherein the fluid that exits the core components is recycled back to the inlet of the main pump.
14. The apparatus or method of any preceding embodiment, wherein the temperature of the fluid is maintained in the range 30° C. to 80° C.
15. The method or apparatus of any preceding embodiment, where the impact head is maintained at a temperature less than 50° C.
16. The method or apparatus of embodiment 15, where the impact head (16) is maintained at a temperature less than 10° C.
17. The method or apparatus of any preceding embodiment wherein the fluid is impacted upon the impact head (16) at a pressure in the range 10 MPa to 150 MPa.
18. The method or apparatus of any preceding embodiment wherein the fluid is impacted upon the impact head at a pressure in the range 50 MPa to 70 MPa.

19. The method or apparatus of any preceding embodiment wherein the fluid is impacted upon the impact head at a flow rate of greater than 1000l/hr.
20. The method or apparatus of any preceding embodiment wherein the laminarmaterial loading in the liquid phase is in the range up to 500 grams per litre (g/l).
21. The use of the apparatus of any of embodiments 1 to 11 for the production of Graphene and similar atomic scale laminar materials by the delamination of a bulk laminar material.
22. The use of the apparatus of any of embodiments 1 to 11 for the production of Graphene and similar atomic scale laminar materials wherein the solid particles are particles of graphite, hexagonal boron nitride or molybdenum disulphide.
23. The use of the apparatus of any of embodiments 1 to 12 for the production of graphene from an aqueous suspension of graphite.

What is claimed is:

1. An apparatus for the production of Graphene and similar atomic scale laminar materials by the delamination of a bulk laminar material; the apparatus comprising:
   a main pump (112) suitable for pumping a fluid, the fluid being a suspension of solid particles of the bulk laminar material, at a pressure of greater than 1 MPa, towards and in fluid communication with;
   core components (10), the core components comprising:
   a fluid conduit (12) having a principal axis suitable for conveying said fluid, wherein the fluid conduit is arranged to direct fluid at said pressure from that conduit against;
   an impact head (16) having an impact face perpendicular or substantially perpendicular to said principal axis; the impact head and the conduit being arranged so that an annular gap (20) of between 500 μm and 1 μm results between an end of the conduit proximate to the impact head and the impact head wherein the gap forms a continuous region surrounding the end of the conduit and being substantially coplanar with the impact head; and
   an impact head surround (26) which extends the region in which the fluid is constrained before exiting the core components, wherein, the impact head is cooled, the apparatus thereby comprising a cooled impact head.
2. The apparatus of claim 1, wherein the apparatus is configured to enable the impact head at a flow rate of greater than 1000 l/hr to be maintained at a temperature less than 50° C.
3. The apparatus of claim 2, wherein the apparatus is configured to be maintained at a temperature less than 25° C.
4. The apparatus of claim 3, wherein the apparatus is configured to be maintained at a temperature less than 10° C.
5. The apparatus of claim 1 wherein the impact head is a diamond impact head.
6. The apparatus of claim 1, further comprising a pressure drop valve (124) downstream of the impact head (16) so as to provide backpressure.
7. The apparatus of claim 1 wherein the impact head (16) of the apparatus is freely rotatable about the principal axis.
8. The apparatus of claim 1 wherein the impact head (16) of the apparatus is configured to be rotatable about the principal axis as constrained by a mechanism.
9. The apparatus of claim 1 wherein the impact head (16) of the apparatus is configured to, in use, be rotatable at a rate of between 0.01 and 50 rpm.
10. The apparatus of claim 1, wherein the fluid that exits the core components is recycled back or is configured in use to be recycled back to the inlet of the main pump.
11. A method for exfoliation of laminar materials to produce atomic scale laminar materials by the delamination of bulk material; the method comprises the steps of:
   providing the apparatus described in claim 1 and;
   passing through the apparatus a suspension of laminar material in a liquid at a pressure of greater than MPa at the impact head.
12. The method of claim 11, wherein the temperature of the fluid is maintained in the range 30° C. to 80° C.
13. The method of claim 11, where the impact head is maintained at a temperature less than 50° C.
14. The method of claim 11, wherein the fluid that exits the core components is recycled back to the inlet of the main pump.
15. The method of claim 14, where the impact head (16) is maintained at a temperature less than 10° C.
16. The method claim 11, wherein the fluid that exits the core components is recycled back or is configured in use to be recycled back to the inlet of the main pump.
17. A method comprising:
   providing an apparatus as described in claim 1 and;
   utilizing the apparatus, producing a Graphene or an atomic scale laminar material by the delamination of a bulk laminar material.

* * * * *